(12) United States Patent
Brugidou et al.

(10) Patent No.: US 11,673,442 B2
(45) Date of Patent: Jun. 13, 2023

(54) AMPHIBIOUS VEHICLE MOUNTED ON CATERPILLAR TRACKS

(71) Applicant: IGUANA YACHTS, Brehal (FR)

(72) Inventors: Antoine Brugidou, St. Germain en Laye (FR); Florent Mirieu De Labarre, Caen (FR); Steve Huppert, Dinard (FR); Eric Leparfait, Fontaine-Henry (FR)

(73) Assignee: Iguana Yachts, Mondeville (FR)

( * ) Notice: Subject to any disclaimer, the term of this patent is extended or adjusted under 35 U.S.C. 154(b) by 1173 days.

(21) Appl. No.: 16/320,549

(22) PCT Filed: Jul. 5, 2017

(86) PCT No.: PCT/FR2017/051826
§ 371 (c)(1),
(2) Date: Jan. 25, 2019

(87) PCT Pub. No.: WO2018/020093
PCT Pub. Date: Feb. 1, 2018

(65) Prior Publication Data
US 2019/0270357 A1    Sep. 5, 2019

(30) Foreign Application Priority Data
Jul. 28, 2016    (FR) ........................ 1657325

(51) Int. Cl.
*B60G 11/107*    (2006.01)
*B60F 3/00*    (2006.01)
(Continued)

(52) U.S. Cl.
CPC .......... *B60G 11/107* (2013.01); *B60F 3/0015* (2013.01); *B60G 11/04* (2013.01);
(Continued)

(58) Field of Classification Search
CPC ................ B60G 11/07; B60G 2300/28; B60G 2300/32; B60F 3/0015; B62D 55/14; B62D 55/104; B62D 55/1086; B60Y 2200/42
See application file for complete search history.

(56) References Cited

U.S. PATENT DOCUMENTS 3,620,318 A * 11/1971 Gostomski ............. B62D 55/30
                                              180/9.1
3,756,667 A * 9/1973 Bombardier ........... B62M 27/02
                                              180/193
4,871,188 A * 10/1989 Baxter .................... B60G 5/02
                                              280/686
5,180,478 A * 1/1993 Hughes ............... C23C 14/3407
                                              204/192.2

(Continued)
FOREIGN PATENT DOCUMENTS

CA        870498 A    5/1971
EP      2570694 A1    3/2013
(Continued)

OTHER PUBLICATIONS

International Search Report dated Oct. 30, 2017, for International Application No. PCT/FR2017/051826.

*Primary Examiner* — Tony H Winner
(74) *Attorney, Agent, or Firm* — Renner, Kenner, Greive, Bobak, Taylor & Weber Co., LPA

(57) ABSTRACT

Vehicle comprising a hull and motorised aquatic propulsion members and motorised land propulsion members, this vehicle being able to move between a navigation position and a land transport position in which it rests on sets of caterpillar tracks. Each set of caterpillar tracks (1) is equipped with an even number of rollers (7) so as to define a set of adjacent roller pairs (71, 72). The rollers (71, 72) of each pair are connected to the chassis (2) by suspension means comprising a set (12) of at least two superposed curved elastic leaves made of a fibre-reinforced thermosetting resin, namely an upper leaf (131) and a lower leaf (132), the set being fixed on the one hand to the axles (9) of the rollers (71, 72) at its respective ends and, on the other hand, (Continued)

to the chassis (2) in its central part, and the upper leaf (13*i*) and the lower leaf (132) of each of the sets of leaves (12) are joined together and covered with a layer of elastomer (14).

8 Claims, 3 Drawing Sheets

(51) Int. Cl.
  *B62D 55/104* (2006.01)
  *B62D 55/14* (2006.01)
  *B60G 11/04* (2006.01)
  *B62D 55/108* (2006.01)
  *B62D 55/20* (2006.01)

(52) U.S. Cl.
  CPC ......... *B62D 55/104* (2013.01); *B62D 55/108* (2013.01); *B62D 55/14* (2013.01); *B62D 55/202* (2013.01); *B60F 2301/04* (2013.01); *B60G 2202/112* (2013.01); *B60G 2206/7101* (2013.01); *B60G 2300/28* (2013.01); *B60G 2300/32* (2013.01); *B60Y 2200/42* (2013.01)

(56) References Cited

U.S. PATENT DOCUMENTS

| | | | | |
|---|---|---|---|---|
| 6,595,812 | B1 * | 7/2003 | Haney | B60F 3/0076 |
| | | | | 440/12.5 |
| 8,632,370 | B2 * | 1/2014 | Fritsch | B60F 3/003 |
| | | | | 440/12.5 |
| 11,084,346 | B2 * | 8/2021 | Fisher | B60F 3/0015 |
| 2005/0003715 | A1 * | 1/2005 | Hewitt | B62D 55/084 |
| | | | | 440/12.5 |
| 2008/0105472 | A1 * | 5/2008 | Tuhy | B60G 5/01 |
| | | | | 180/9.5 |
| 2013/0049273 | A1 | 2/2013 | Shigematsu et al. | |
| 2015/0004854 | A1 * | 1/2015 | Hewitt | B63H 21/14 |
| | | | | 440/12.52 |
| 2018/0208008 | A1 * | 7/2018 | Boyd | B60F 3/0015 |
| 2018/0318722 | A1 * | 11/2018 | Smith | A63G 7/00 |

FOREIGN PATENT DOCUMENTS

GB 415829 6/1934
WO 2013160605 A1 10/2013

* cited by examiner

AMPHIBIOUS VEHICLE MOUNTED ON CATERPILLAR TRACKS

The invention herein pertains to an amphibious vehicle mounted on caterpillar tracks.

Specialists have already proposed various types of amphibious vehicles that have the advantage of being able to travel on land and water.

One vehicle, cited as an example, is described in document WO 2013/160605 A1.

This amphibious vehicle incorporates a hull in the longitudinal axis, together with motor-driven aquatic propulsion units and motor-driven overland propulsion units.

These overland propulsion units incorporate two pairs of lateral actuating arms respectively articulated around, firstly, the hull, on either side of it, at one of their extremities, or the upper extremity, and, secondly, on a long beam connecting the two arms of each pair, at their second extremity, or the lower extremity, such as to form a rigid articulated chassis bearing a track layer assembly.

In this description herein, it should be noted that the terms "lower" and "upper" pertain to the amphibious vehicle, considering it in its normal position of travel over land or water.

In such a vehicle, each of the track layer assemblies is equipped with a series of transversal track rollers being located one behind the other parallel to the longitudinal axis of the hull, and being each fitted with two wheels mounted on roller bearings around a rotation shaft perpendicular to the longitudinal axis of the hull.

Each rigid chassis is able to move between a retracted position, or navigation position, in which it is housed in a lateral cavity in the hull, and a deployed position, or terrestrial transportation position, in which the amphibious vehicle sits on the track layer assemblies.

Such a vehicle has multiple advantages because the overland propulsion units are retracted in the navigation position, and do not therefore detract from the hydrodynamic characteristics of the hull, and in which the track layer assemblies provide effective overland propulsion over whatever terrain.

However, in such a vehicle, the track layer assemblies and the chassis's are unsuspended rigid assemblies, which considerably detracts from user comfort.

This is because the transversal rollers are mounted directly on the chassis, at the respective extremities of the axis of rotation, and the wheels of these rollers are joined integrally and rotate around the axis of rotation via tapered roller bearings and oblique-contact roller bearings.

To overcome these disadvantages, specialists have envisioned connecting two neighboring rollers via a flexible leaf spring made of a steel similar to that of the suspension leaf springs fitted on utility vehicles, and connecting this leaf spring at the rotation shafts, at its respective extremities, and to the chassis at its central part.

However, such a configuration proves to be unusable in practice, because of its excessive complexity and the inadequacy of the mechanical performances thereby obtained.

To improve these performances, replacing the steel leaf springs with fiber-glass-reinforced epoxy resin leaf springs has also been envisioned; this solution has also proved unsuccessful because of the breakable nature of such leaf springs.

The invention herein addresses an amphibious vehicle mounted on caterpillar tracks, of the above-mentioned type, designed to overcome these disadvantages.

According to the invention, each track layer assembly on the vehicle is equipped with an even number of rollers, such as to constitute a set of pairs of neighboring rollers, and the rollers of each pair are connected to the chassis by means of suspension systems that each incorporate a set of at least two curved flexible leaf springs made of a heat-hardening resin—notably made of an epoxy resin reinforced with superimposed fibers, notably glass fibers—namely one upper leaf spring and one lower leaf spring.

The upper leaf spring and the lower leaf spring of each of the leaf spring sets are connected to each other and are covered with a layer of elastomer, notably polyurethane.

The adherence of the elastomer to the leaf springs is obtained through an over-molding operation.

One such leaf spring set is secured, firstly, to the roller shafts at its respective extremities and, secondly, to the chassis at its central part.

According to one particularly-advantageous characteristic of the invention, the lower leaf spring of each leaf set is longer and less stiff than the upper leaf spring of the set, and is secured to the roller shafts at its respective extremities, via a counter-plate.

The lower leaf spring/rollers and counter-plates rotation shaft sets are positioned and held by bolts fitted right through the assembly.

According to another particularly-advantageous characteristic of the invention, the radius of curvature of the lower leaf spring of a leaf spring set is smaller than the radius of curvature of the upper leaf spring of the said set.

Such a configuration has proven satisfactory, both as regards its performances and with regard to user comfort.

It is notably characterized by surprising amplitudes of flexing before breakage under a load, due to a non-linear stiffness.

More precisely, in the presence of a vertical stress applied at the middle of a leaf spring set, the neutral fiber is located at the center of the set, and the stiffer upper leaf spring has compressing force exerted on it while the more-flexible lower leaf spring has an extending force exerted on it.

Yet it is known that a leaf spring made of a fiber-reinforced heat-hardening resin is weaker under compression than under extension and that, under the effect of such a force, the upper leaf spring will break before the lower leaf spring, with this phenomenon accentuating with greater rigidity.

This situation is, however, "moderated" by the presence of the elastomer between the two leaf springs, of which the Shore hardness and the thickness are appropriate for maintaining the join between the leaf springs in the presence of longitudinal stresses and imposing the overall stiffness of the assembly, plus—in parallel—enabling a longitudinal slippage of the two leaf springs in relation to each other.

This is because, during the application of a load from the chassis or of a load on a roller, the lower leaf spring—which is longer and more flexible—flexes first in reaction, and does so as a function of the load.

As the load increases, the elastomer located between the two leaf springs progressively compresses, and stiffness is contributed by only the lower leaf spring and the elastomer (due to its compression), while the more-rigid upper leaf spring initially undergoes little or no distortion.

It is only when the elastomer is compressed to the maximum, due to the increase in the load, that the distortion of the lower leaf spring progressively causes a distortion of the upper leaf spring, such that the stiffness of the upper leaf spring is added to that of the lower leaf spring.

The particular configuration of the leaf spring set thus procures a retarding effect, such as to prevent the upper leaf spring from breaking too quickly and to subsequently obtain a high stiffness and flexing within a very compact assembly.

This advantage is greatened by the particular configuration of the rollers, which are each composed of a sealed assembly incorporating a rotation shaft shaped to accommodate the counter-plate securing the leaf spring set, two independent wheels, and two roller bearings each incorporating two rows of oblique-contact ballbearings taking the axial and radial forces, that are fitted directly into each of the wheels.

This very-compact assembly enables the accommodation of very high axial and radial mechanical loads appropriate for the forces exerted on the leaf spring set.

According to another characteristic of the invention, each leaf spring set is connected to the chassis at its central part by means of securing bolts via a yoke that is essentially U-shaped and of which the middle branch is applied against its upper face.

Such a securing yoke advantageously interoperates with a tightening flange bearing against the lower face of each leaf spring set, so that the said leaf spring set is sandwiched and held between the said tightening flange and the securing yoke, at its central part.

According to another characteristic of the invention, the upper leaf spring and, where appropriate, the lower leaf spring of each leaf spring set is/are endowed with a central transversal protrusion on its/their exterior face, that has the function of preventing a longitudinal displacement of the leaf spring set in relation to the chassis.

For this, the securing yokes and, where appropriate, the tightening flanges incorporate a cavity matching the transversal protrusions of the leaf spring sets, such as to accommodate the said transversal saliences and thus prevent the longitudinal displacement of the leaf spring sets in relation to the chassis.

The characteristics of the amphibious vehicle addressed by the invention will be described in greater detail, with reference to the appended non-limitative drawings, in which.

Figure 1:
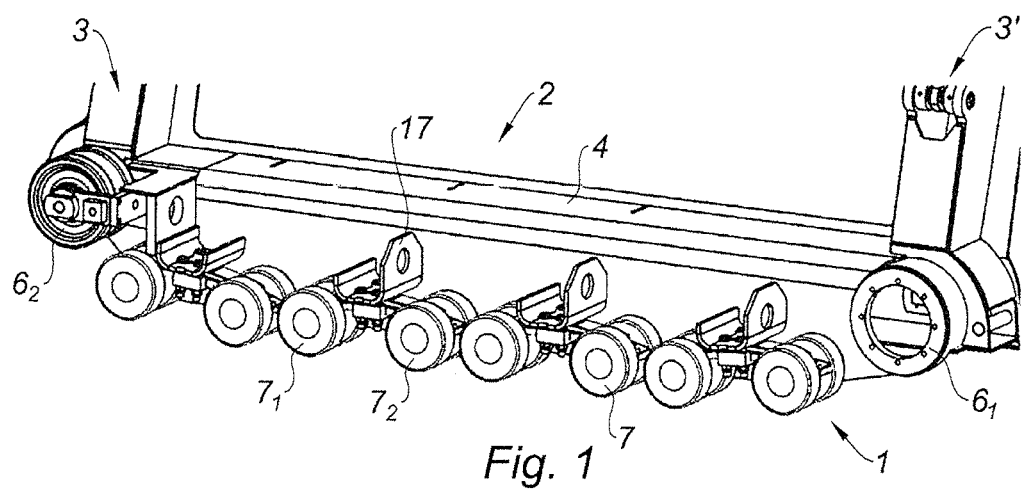
FIG. 1 is an in-perspective schematic view of a track layer assembly, in which the track has been removed.
Figure 2:
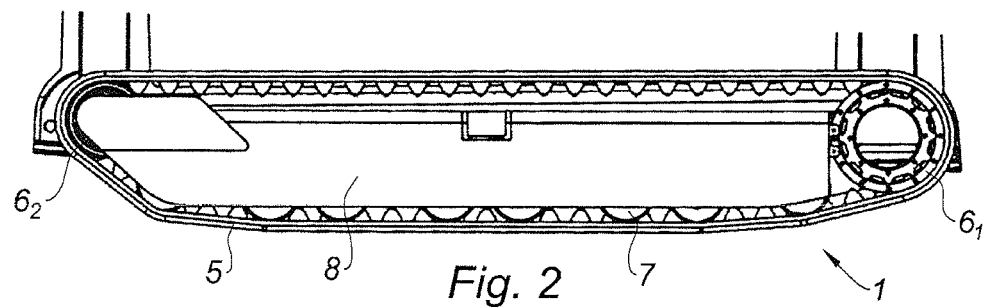
FIG. 2 is a front view of such a complete track layer assembly.

In FIGS. 1 and 2, the track layer assembly (1) is mounted on a rigid articulated chassis (2) incorporating two articulated arms (3, 3') on either side of a long beam (4) connecting the said arms (3, 3').

The track layer assembly (1) incorporates a rotating caterpillar track (5) driven in rotation by a drive sprocket (6) and passing over a guide and tensioning roller, together with a series of transversal track rollers (7) located one behind the other in the direction of travel of the track layer assembly.

In FIG. 2, a bezel (8) welded onto the long beam (4) conceals the transversal rollers (7).

Figure 7:
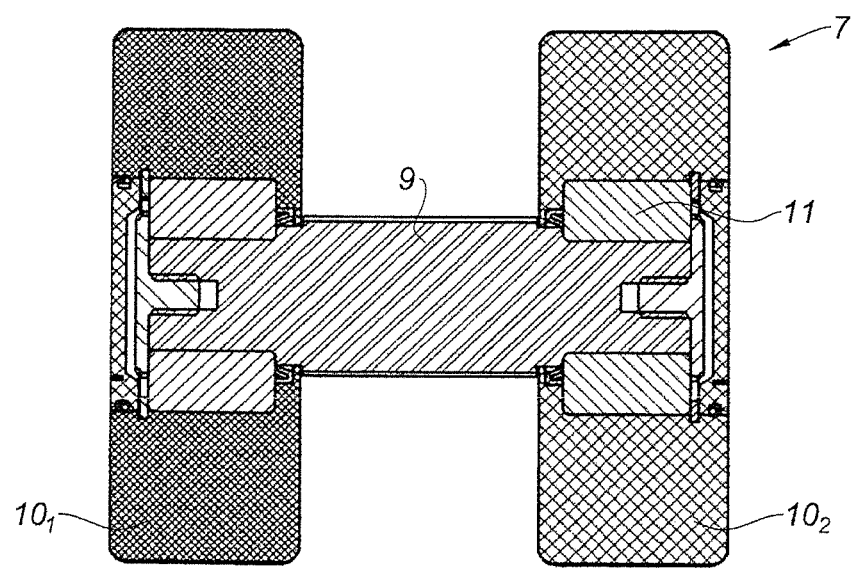
FIG. 7 is a cross-section of a roller.

In FIG. 7, each of the transversal rollers (7) incorporates a rotation shaft (9) on which two wheels ($10_1$, $10_2$) are mounted via roller bearings (11) each incorporating two rows of oblique-contact ballbearings, and which are respectively fitted into each of the wheels ($10_1$, $10_2$).

In FIG. 1, each track layer assembly (1) is equipped with eight track rollers divided into four pairs of neighboring rollers ($7_1$, $7_2$).

Figure 3:
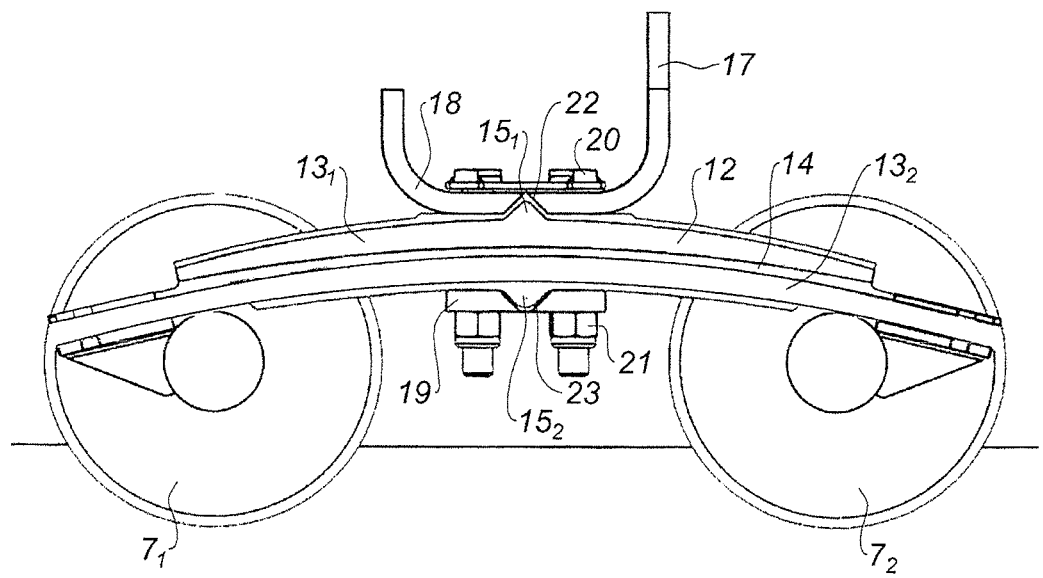
FIG. 3 is a cross-section of a pair of rollers connected by a leaf spring set.
Figure 4:
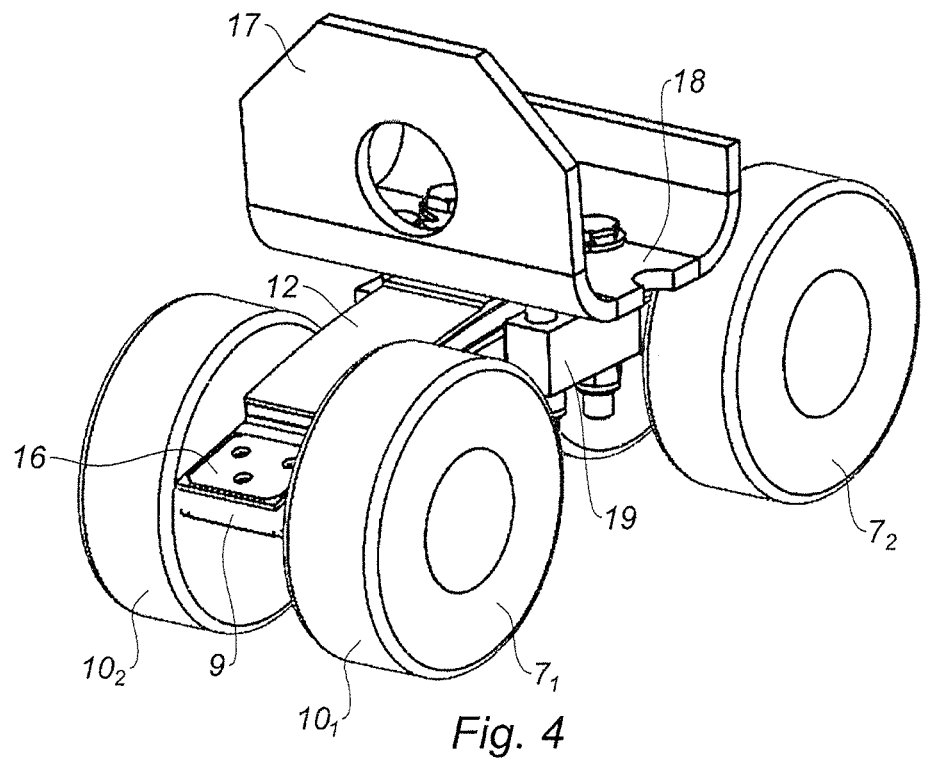
FIGS. 4 and 5 are in-perspective views, at different angles, of the pair of rollers illustrated in FIG. 3.
Figure 5:
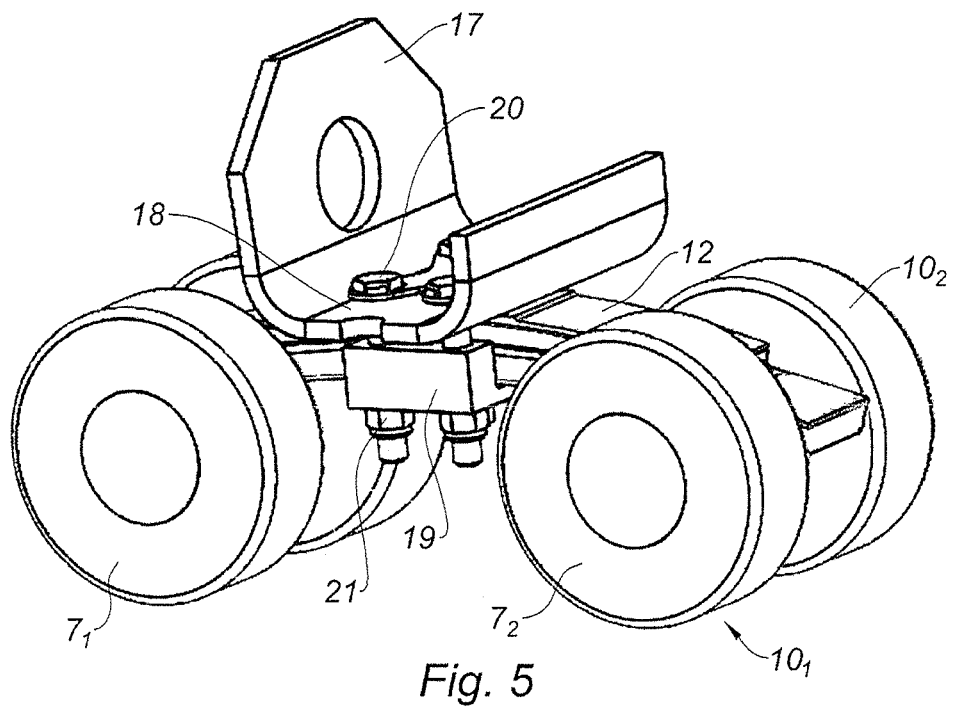

In FIGS. 3, 4 and 5, the rollers ($7_1$, $7_2$) of each pair are connected to the chassis (2) by means of suspension systems principally composed of a set of flexible leaf springs (12) secured to the shafts (9) of the rollers ($7_1$, $7_2$) at its extremities, and to the chassis (2), at its central part, in a manner that is described in greater detail subsequently in this explanation.

Figure 6:
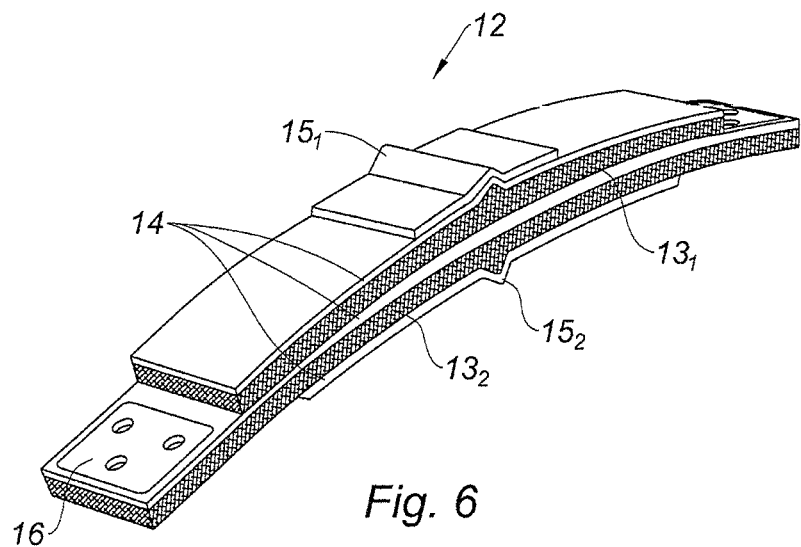
FIG. 6 is an in-perspective view of a leaf spring set.

In FIG. 6, each flexible leaf spring set is composed of two curved flexible leaf springs made of an epoxy resin reinforced with superimposed glass fibers, namely one upper flexible leaf spring ($13_2$) and one lower flexible leaf spring ($13_1$).

These two flexible leaf springs—the upper leaf spring ($13_1$) and the lower leaf spring ($13_2$)—are connected together and are covered with a layer of polyurethane (14).

In FIG. 6, in each of the flexible leaf spring sets (12), the lower leaf spring ($13_2$) is longer and less stiff than the upper leaf spring ($13_1$), and has a radius of curvature that is less than the radius of curvature of the upper leaf spring ($13_1$), such that the thickness of the polyurethane layer inserted between these leaf springs ($13_1$, $13_2$) is greater at the extremities of the flexible leaf spring set than at its central part.

At this central part, the upper leaf spring ($13_1$) and the lower leaf spring ($13_2$) have a transversal protrusion ($15_1$, $15_2$) on their respective exterior faces, that has a trianguar cross-section that prevents any longitudinal displacement of the flexible leaf spring set (12) in relation to the chassis (2).

In FIGS. 4 and 6, the lower leaf spring ($13_2$) is equipped at each of its extremities with a counter-plate (16) that secures the flexible leaf spring set (12) onto the shafts (9) of the rollers ($7_1$, $7_2$) of a roller pair (7), at its respective extremities, by means of bolts that are not illustrated in the drawings.

In FIGS. 1, 3, 4 and 5, the flexible leaf spring set (12) connecting the rollers ($7_1$, $7_2$) of a roller pair is connected to the chassis (2), at the middle part, by means of an essentially U-shaped yoke (17) of which the middle branch (18) bears against the upper face of the flexible leaf spring set (12), such as can be observed in FIGS. 3, 4 and 5.

In FIGS. 4 and 5, the securing yoke (17) interoperates with a tightening flange (19) bearing against the lower face of the flexible leaf spring set (12), such that it is sandwiched between the said tightening flange (19) and the securing yoke (18), at its central part.

The assembly thus formed is secured either side of the flexible leaf spring set (12) by bolts (20) fitted right through the said assembly, and by nuts (21).

In FIG. 3, the securing yoke (17) and the tightening flange (19) incorporate a transversal cavity (22, 23) with a geometry matching that of the transversal protrusions ($15_1$, $15_2$) of the flexible leaf spring set, so as to be able to accommodate these transversal protrusions, in order to prevent any longitudinal displacement of the flexible leaf spring set (12) in relation to the chassis (2).

NOMENCLATURE

1. Caterpillar track layer assembly
2. Rigid chassis
3, 3'. Articulated arm
4. Long beam
5. Rotary caterpillar track
$6_1$. Drive sprocket $6_2$. Guide and tensioning roller
7. Transversal rollers
$7_1$, $7_2$. Roller pair
8. Bezel
9. Rotation shaft
$10_1$, $10_2$. Wheel
11. Roller bearing
12. Flexible leaf spring set
$13_1$. Upper flexible leaf spring
$13_2$. Lower flexible leaf spring
14. Polyurethane layer
$15_1$, $15_2$ Transversal protrusions
16. Counter-plate
17. Yoke
18. Middle branch
19. Tightening flange
20. Bolt
21. Nut
22, 23. Transversal cavities

The invention claimed is:

1. An amphibious vehicle having a hull with a longitudinal axis and at least one lateral cavity, one or more motor-driven aquatic propulsion units, and one or more motor-driven overland propulsion units, each overland propulsion unit including at least one rigid articulated chassis and at least one track layer assembly mounted on the at least one rigid articulated chassis, wherein the at least one rigid chassis (2) is adapted to move between a retracted position, in which it is housed in a lateral cavity in the hull, and a deployed position, in which the amphibious vehicle rests on the at least one track layer assembly;
   the at least one rigid articulated chassis including: two pairs of lateral actuating arms (3, 3') and a long beam connecting the two pairs of lateral actuating arms, each lateral actuating arm having an upper extremity and a lower extremity, wherein the upper extremity of each lateral actuating arm is articulated around, the hull, and the lower extremity of each lateral actuating arm is articulated around the long beam, and
   the at least one track layer assembly (1) being equipped with a series of transversal rollers (7) located one behind the other, parallel to the longitudinal axis of the hull, and being each endowed with two wheels ($10_1$, $10_2$) mounted on roller beatings (11) on a rotation shaft (9) that is perpendicular to the longitudinal axis of the hull, wherein the series of transversal rollers includes an even number of rollers, such as to form one or more sets of neighboring roller pairs: wherein the rollers ($7_1$, $7_2$) of each pair are connected to the rigid articulated chassis (2) by means of a suspension unit that includes a leaf spring set (12) of at least two curved flexible leaf springs made of a heat-hardening resin that is reinforced with superimposed fibers, wherein each flexible leaf spring includes a central portion and two extremities, wherein the at least two curved flexible leaf springs include one upper leaf spring ($13_1$) and one lower leaf spring ($13_2$), wherein each of the two extremities of each flexible leaf spring is connected to a rotation shaft (9) and the central portion of each leaf spring is connected to the chassis (2), and wherein the upper leaf spring ($13_1$) and the lower leaf spring ($13_2$) of each leaf spring set (12) are connected and are covered with a layer of elastomer (14).

2. The amphibious vehicle in accordance with claim 1, wherein each leaf spring is defined by a radius of curvature, the radius of curvature of each lower leaf spring ($13_2$) is smaller than the radius of curvature of each upper leaf spring ($13_1$).

3. The amphibious vehicle in accordance with claim 1, wherein each upper leaf spring ($13_1$) is includes an exterior face a central transversal protrusion ($15_1$, $15_2$) on the exterior face, wherein the central transversal protrusion has a triangular cross-section.

4. The amphibious vehicle in accordance with claim 3, wherein each leaf spring set (12) is secured to the chassis (2) by means of bolts, via a securing yoke (17) that is essentially U-shaped, wherein the securing yoke (17) includes a transversal cavity (22) that accomodates the central transversal protrusion ($15_1$, $15_2$) of the leaf spring sets (12).

5. The amphibious vehicle in accordance with claim 1, wherein each leaf spring set (12) is secured to the chassis (2) by means of bolts, via a securing yoke (17) that is essentially U-shaped.

6. The amphibious vehicle in accordance with claim 5, wherein the securing yoke (17) interoperates with a tightening flange (19), such that the leaf spring sets (12 ) are sandwiched and held between the said tightening flange (19) and the securing yoke (17).

7. The amphibious vehicle in accordance with claim 1, wherein the lower leaf spring ($13_2$) of each leaf spring set (12) is longer and less stiff than the upper leaf spring ($13_1$) of each leaf spring set.

8. The amphibious vehicle in accordance with claim 7, wherein the lower leaf spring of each leaf spring set includes a counter-plate at each extremity that is secured to the rotation shaft by using bolts.

* * * * *